United States Patent [19]

Nehrbass et al.

[11] 4,319,694

[45] Mar. 16, 1982

[54] REFUSE RECEPTACLE WITH RENEWABLE LINERS

[76] Inventors: Joel M. Nehrbass, 600 S. Main St., West Bend, Wis. 53905; Gary J. Dorzok, 408 River Dr., West Bend, Wis. 53095

[21] Appl. No.: 196,638

[22] Filed: Oct. 14, 1980

[51] Int. Cl.³ .......................... B65F 1/06; B65D 25/16
[52] U.S. Cl. .................................. 220/407; 220/1 T; 220/404
[58] Field of Search .............. 220/1 T, 403, 404, 407; 206/225

[56] References Cited

U.S. PATENT DOCUMENTS

| | | | |
|---|---|---|---|
| 3,300,082 | 1/1967 | Patterson | 220/407 |
| 3,309,160 | 3/1967 | Lewis | 220/1 T |
| 3,392,825 | 7/1968 | Gale | 220/407 |
| 3,451,453 | 6/1969 | Heck | 220/407 |
| 3,481,112 | 12/1969 | Bourgeois | 220/407 |
| 3,800,503 | 4/1974 | Maki | 220/404 |

FOREIGN PATENT DOCUMENTS

| | | | |
|---|---|---|---|
| 1258332 | 1/1968 | Fed. Rep. of Germany | 220/407 |
| 1268051 | 5/1968 | Fed. Rep. of Germany | 220/404 |
| 1478824 | 7/1977 | United Kingdom | 220/407 |

*Primary Examiner*—George E. Lowrance
*Attorney, Agent, or Firm*—Emrich, Root, Lee, Brown & Hill

[57] ABSTRACT

The bottom wall of a refuse receptacle contains a bin which opens therethrough into the interior of the receptacle to receive a roll of separably-connected bag-type liners. The bin opening is closed by a removable cover which seats flush with the receptacle bottom wall and has a slot through which the liners are dispensed into the interior of the receptacle. The cover also has tabs along two opposite sides which frictionally catch beneath the bottom wall of the receptacle to removably receive the cover in place.

9 Claims, 7 Drawing Figures

U.S. Patent  Mar. 16, 1982  4,319,694
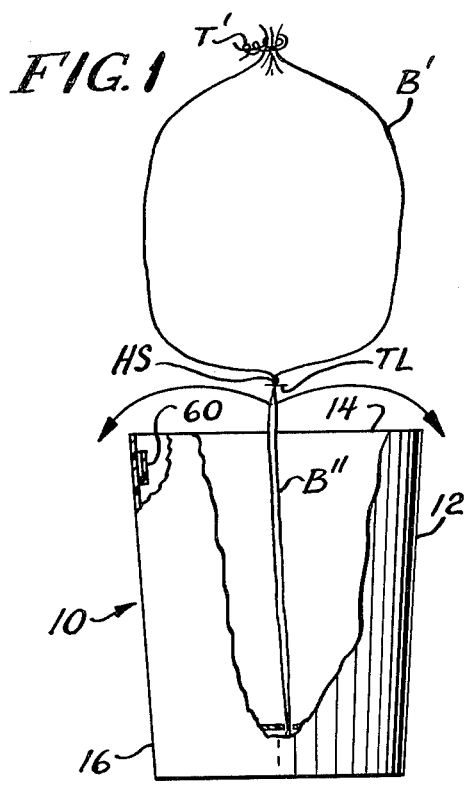
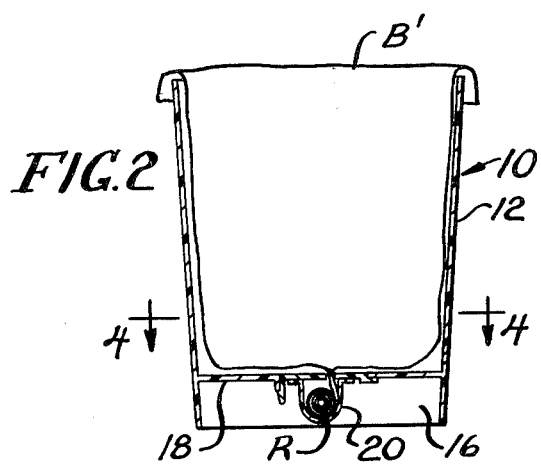
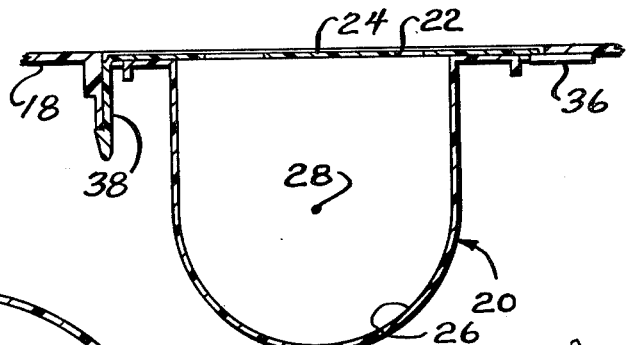
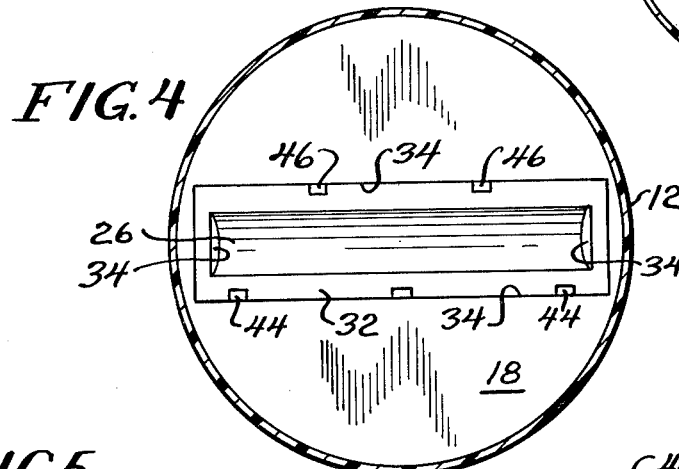
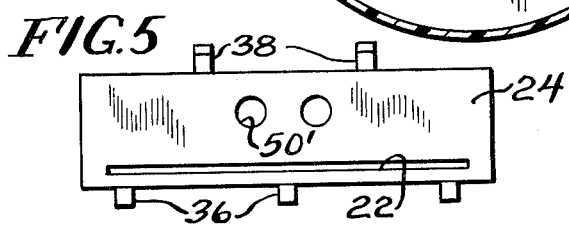
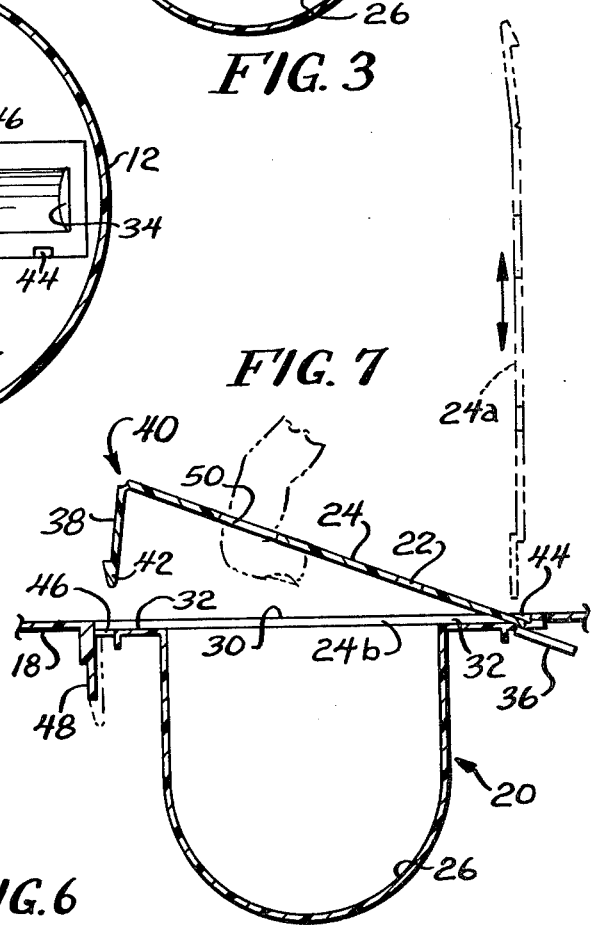
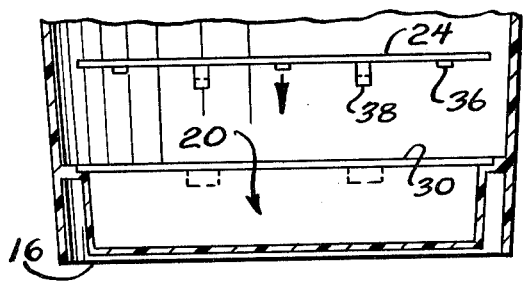

REFUSE RECEPTACLE WITH RENEWABLE LINERS

This invention relates to refuse receptacles or containers and the like. It relates particularly to those in which liners are stored for use within the receptacle so as to be available as required to line the interior thereof and facilitate the collection and disposal of waste and other refuse material deposited therein.

U.S. Pat. Nos. 3,300,082, 3,392,825, 3,451,453, 3,481,112, 3,760,975 and 3,800,503 are exemplary of previously-disclosed waste or refuse receptacles in which a supply of interleaved or end-to-end connected bags are stored in a provided area of the receptacle bottom for dispensing one at a time to line the interior of the receptacle or container. In these known receptacles, the end bag is grasped and pulled up through the receptacle interior, opened and spread out to conform to the interior of the receptacle. The open end of the bag is then everted over the top edge of the receptacle. When filled with refuse, the everted end of the bag is removed from about the receptacle upper edge, closed and tied or otherwise sealed for disposal. The bag is then raised out through the top end of the receptacle, this act drawing the next bag of the roll into position. At that time, the full bag is separated from the roll as along a provided perforation line. The steps of opening, spreading out and everting the end of the bag over the top edge of the receptacle are then repeated for the next bag which readies the receptacle to receive more waste or refuse.

The inventors, however, are unaware that such receptacles are available in the marketplace; and, since such a concept is believed to portend great utility, a principal object of this invention is to provide such a receptacle which is both commercially practical to produce and manufacture and at the same time is sufficiently simple in structure and convenient to use as to satisfy the needs of the consumer.

In accordance with this invention, the shape of the receptacle or container itself is not critical. It may be round or rectangular in shape and can be molded of suitable plastics such as polypropylene.

A feature of the refuse receptacle or container is that its bottom wall contains an integrally-molded storage bin which opens through the bottom wall of the container into the interior thereof. The base is rectangular in shape and sized for convenient insertion of the roll of bag lines. The base of the bin is rounded or cylindrical in shape so that the roll of bags rests on a curved seat corresponding to its own shape and the base of the bin is located at a depth such that the bin accepts a full size roll of end-to-end connected bags which lies wholly below the level of the container bottom wall.

A further feature of the invention is that the opening of the bin through the container bottom wall is closed by a cover which frictionally catches thereto, the cover having a slot which extends axially of the bin and preferably adjacent one of the two longer sides of the lid, this slot serving to guide the bag liners as they are pulled off the roll to renew lining of the container interior.

Other features of the invention are that the cover, being readily detachable, facilitates the installation of a new roll of end-to-end connected bag liners as each roll is consumed. The cover is preferably of a plastic material sufficiently rigid that in closing off the container bottom wall opening into the bin, it supports the weight of the refuse deposited into the receptacle container. It also positions the roll on a curved seat so that the roll freely turns during the act of pulling the end bag through the slot to renew the lining of the container interior.

A further important feature of the invention is that a small storage area is conveniently provided at the top edge of the refuse container for the ties or string pieces which are utilized to close the filled bag liners. The ties are, therefore, conveniently available for use as required.

The invention also includes a novel construction of cover for closing the open end of the bag liner storage bin which is both practical to manufacture as well as one that is simple and convenient to use by the consumer.

Other objects, advantages and features of the invention will be at once apparent or will become apparent upon consideration of the presently preferred embodiment of the invention which now will be described in connection with the figures comprising the accompanying drawings.

Referring now to the drawings:

FIG. 1 illustrates one form of the invention and schematically demonstrates its use;

FIG. 2 is a vertical sectional view taken through the waste or refuse receptacle illustrated in FIG. 1;

FIG. 3 shows on a larger scale, the assembly of the closure cover over the bin opening;

FIG. 4 is a sectional view taken along line 4—4 of FIG. 2 looking in the direction indicated by the arrows and illustrates the disposition and shape of the surrounding shelf or ledge on the bottom wall about the bin opening against which the cover is assembled;

FIG. 5 is a top plan view of the closure cover; the cover being illustrated separate from the other components of the refuse receptacle;

FIG. 6 is a fragmented view generally similar to the view illustrated by FIG. 3 but disposed at right angles thereto and illustrates the bin closure cover over the bin and aligned therewith for assembly; and FIG. 7 is a view generally similar to FIG. 3 but on a larger scale and illustrates the assembly of the bin closure cover to the bottom wall of the container.

Referring now more specifically to the several views taken like parts are identified by like reference numerals, FIGS. 1 and 2 illustrate the invention embodied in a container 10 which is preferably molded in one piece of polypropylene or other suitable plastic. It may also be formed of sheet metal, fibre board or other material of which waste and/or refuse receptacles are conventionally formed. As illustrated, container 10 is generally round in cross-section and embodies an upstanding wall 12 which is slightly flared such that its open-top end 14 is of larger diameter than is its pedestal-constituting lower end 16. Container 10, however, may be of any other conventional shape. For example, it may be oval or rectangular in cross-section and with or without rounded corners.

In accordance with this invention, bottom wall 18 of the container is spaced above the pedestal-constituting lower end 16 of the container 10 and contains a depending storage bin 20 for a roll of end-to-end connected liner bags identified generally at R. Bottom wall 18 of the container is shown spaced above the pedestal-constituting lower end 16 of the container at a height such that the depending bin 20 is spaced off and does not contact the supporting surface on which the receptacle stands. Preferably, bin 20 is molded with, and comprises an integral part of, the container bottom wall 18. Conceivably, it also could be separately formed and cemented or otherwise fixed to the underside of the container bottom wall 18. As illustrated in FIGS. 2 and 3, bin 20 communicates with the interior of the container through an opening 30 in the container bottom wall 18 which is closed by a detachable cover 24 containing a slot 22 through which the free end of a roll of end-to-end connected bags B stored in bin 20 is dispensed or guided for use in lining the interior of the container as afterwards explained.

The base of the bin 20 is rounded or cylindrical in shape so as to provide a curved seat 26 on which the roll R rests. Usefully, axis 28 of said cylindrically-curved seat 26 coincides with the axis of a full size roll of liner bags which is stored in the bin. Said roll R as is conventional, comprises a length of tubular film stock of plastic e.g., 2 millimeters thick, which is interrupted at regular intervals by a heat seal HS across the width thereof and followed by a line of perforations TL thereacross (as is conventional) Thus, the length of tubular stock comprises end-to-end bags detachably connected by a line of perforations, said bags being suitably dimensioned so that each, when dispensed through slot 22 in cover 24, may be opened and spread apart or expanded to conform to the shape of the container interior through its full width and height of the container. Preferably, said end-to-end connected bags are so folded that roll R has an axial dimension less than the diameter of the container which they are to line.

In accordance with this invention, both the axial length and depth of the bin 20 are only slightly greater than the corresponding axial length and diameter of the rolled bags such that the roll R lies wholly below the container bottom roll 18; and when viewed horizontally, bin 20 has a generally rectangular shape as illustrated in FIG. 4, the width and length of which only slightly exceed the dimensions of roll R, wherefor the roll R is free to rotate on the curved seat 26 but is otherwise restrained against sidewise displacement.

Bin 20 communicates with the interior of container 10 through the aforementioned generally rectangular-shaped opening 30 in the container bottom wall. The dimensions of said opening preferably approximate the greatest width and length of the bin. The length and width of the bin should align with the corresponding dimension of the opening 30 and the bin opening should be of sufficient size for convenience in loading a fresh roll of bags therethrough into the bin 20.

In accordance with this invention, the bin opening 30 is closed by the aforementioned cover 24 which is provided with releasable locking means which serve to frictionally secure the cover in place over the bin opening 30.

Cover 24 serves to support the weight of the refuse or waste which is deposited into the bag B lining the container 10 so that it does not encroach into the confines of the bin. It also cooperates with the curved seat, sides and ends of the bin 20 to confine the roll while facilitating its response to the pull of the end bag B through guide slot 22 such that the unrolling of the bags within the bin proceeds freely and substantially unhibited.

Considering now also FIGS. 4-7, the container bottom wall 18 preferably contains recessed ledge or shelf 32 (FIG. 4) which extends about the periphery of opening 30, is also rectangular in shape and is dimensioned to snugly receive and locate the marginal portions of the rectangular shape cover 24. The thickness of the cover 24 also approximates the depth to which the shelf 32 is recessed such that when assembled over opening 30, the cover seats not only snugly against the outer walls of the recessed shelf 32 so that it resists lateral movement but also is flush with the container bottom wall. Cover 24 is preferably molded of a suitable plastic such as polypropylene in one piece, and has a plurality of spaced tabs 36 along each of its two longer sides. As shown best in FIGS. 5 and 7, tabs 36 which are spaced along one of said longer sides of the cover lie in a plane generally parallel to the plane top surface of the cover body but disposed a distance therebelow which substantially equals the thickness of the bottom wall 18. Tabs 38 on the opposite one of the longer sides of the closure cover member 24 are illustrated as formed in the plane of the cover body but bendable therefrom along a fold line or groove 40 which allows said tabs to be bent or flexed out of the plane of the cover 24. FIG. 5 illustrates the cover provided with three spaced tabs 36 and two spaced tabs 38 on its opposite side. However, any other appropriate number of tabs may be utilized. As illustrated by FIG. 4, the bottom wall of the container is provided with a corresponding number of slots 44 and 46 which are spaced apart and adjacent the outer edge 34 of shelf 32 receive tabs 36 and 38.

Thus, referring now to FIG. 7, cover 24 is readily assembled over opening 30 in the bottom wall of the container by first locating cover 24 in a vertical position as illustrated by phantom lines 24a. In this position, tabs 36 on the cover 24 align with slots 44 and are inserted therethrough such that they engage the under side of the cover and constitutes hinges on which the cover 24 is then ratated to close opening 30. As the cover 24 is rotated into its closed position illustrated by phantom lines 24b, tabs 38 are bent so that they pass through receiving slots 46, and their hooked ends 42 catch beneath abutments 48 releaseably locking the cover to the container bottom wall. Thereafter, the cover 24 is easily separated by inserting two fingers of one hand through the provided finger holes 50 and lifting the cover while simultaneously pulling thereon in the direction of slots 44. This action effectively releases the hooked end 42 of tabs 38 from beneath the abutments 48 and allows the cover 24 to be swung to vertical position 24a in which the position separation of the cover is completed by lifting the cover to move tabs 36 through slots 44.

Preferably, as illustrated in FIG. 5, guide slot 22 in the cover 24 through which the free end of the roll of bags R feeds is located immediately adjacent the longer side of the cover 24 and adjacent the shorter tabs 36 on which the cover hinges during the closing act. In said location, any resistance by the cover to the pull of the bags through slot 22 is exerted against the hinge-forming tabs 36 which cannot be separated from the container bottom wall except when the cover is disposed in its vertical position as suggested at 24a.

Thus, with the cover removed, a roll of liner bags R is located in the bin 20 through opening 30. The cover is then assembled by first positioning its hinge tabs 36 through slots 44. Next, the free end of the roll R is threaded through slot 22 in the cover 24 and the cover rotated to its horizontal position illustrated at 24b. Before reaching said position 24b, the longer tabs 38 of the cover are bent back along fold line 40 so that they are positioned to pass through slots 46 and hook about abutments 48. In this position, cover 24 fits snugly against side 34 of shelf 32 flush with the upper surface of the container bottom wall and is not free to move laterally. The cover 30 therefore remains assembled with the container bottom wall and opening 30 into the bin 20 is closed thereby.

As illustrated in FIG. 2, lining of the interior of the container is accomplished by drawing the free end of roll R through slot 22 and upwardly to the top of the container. The thus dispensed end bag B' is then opened and conformed to the interior shape of the contianer 10 and its outer end everted over the top end 14 of the container. When filled with refuse and/or waste, the everted end of the bag B' can be lifted off the container top end 14, gathered and tied, using a tie member T from a supply thereof shown stored in a receiving pocket 60 on the inner side of the container 10. The filled bag B' is then fully raised out of the container 10 pulling the next bag B" through the cover slot 22. As the filled bag B' exits from the container, it is separated from bag B" by tearing or pulling across the perforated line TL. Bag B" is then spread out and conformed to the interior of the container and its outer end everted over the top end 14 of the container and is thus ready for deposit of additional refuse and waste material.

It will be appreciated that the tie storage area 60 for ties T may be formed during molding of the container itself; or, it may be formed as a separate member which is then affixed to the container wall 12 as by cementing. As illustrated in FIG. 1, preferably the tie storage member 60 is affixed to the inner surface of the container wall 12 as by cementing. As illustrated in FIG. 1, preferably the tie storage member 60 is affixed to the inner surface of the container wall 12 immediately below the opened top end 14 thereof so that in the use of the refuse receptacle, the ties are enclosed and concealed from view by the everted end of the bag B. However, it could be affixed to the outer surface of the container wall 12 or in any other suitable location.

Having described our invention and a preferred embodiment thereof, we claim:

1. A refuse receptacle comprising an open top container having an upstanding sidewall and a bottom wall spaced above the pedestal-constituting lower edge of said sidewall, said bottom wall containing a depending bin for storage of a roll of end-to-end connected bags which are used individually for lining the interior of the container, said bottom wall containing a generally rectangular-shaped opening through which a roll of bags can be inserted into the bin, the bin having a generally cylindrical-shaped seat on which the inserted roll of bags rests with its axis disposed generally parallel to the axis of said bin and a bin cover for closing said opening comprised of molded plastic and of a rectangular shape whose dimensions exceed those of the opening in the bottom wall of the container which it closes, said bin cover containing a slot through which one end of the roll of bags is guided into the interior of the container, the container bottom wall having spaced slots along two opposed sides of the rectangular-shaped opening therein, and the bin cover having tabs along its two corresponding sides which extend through said slots and frictionally catch with the container bottom wall so as to releasably lock said bin cover in closed position over said opening.

2. A refuse receptacle as claimed in claim 1 wherein the tabs along one edge of the bin cover are disposed generally parallel thereto and the tabs along its other edge are disposed generally normal thereto.

3. A refuse receptacle as claimed in claim 1 wherein the container bottom wall has a recessed shelf portion surrounding the opening therethrough, said recessed shelf portion being adapted to snugly receive the bin cover, and the spaced slots of the container bottom wall are located adjacent the outer periphery of said shelf.

4. A refuse receptacle as claimed in claim 3 wherein the tabs along one edge of the bin cover are disposed below and generally parallel to the upper side of the bin cover.

5. A refuse receptacle as claimed in claim 3 wherein the tabs along the opposite side of the bin cover are disposed generally normal to the bin cover, and the ends of said tabs along the opposite edge of the bin cover are hook-shaped and frictionally catch beneath the container bottom wall.

6. A refuse receptacle as claimed in claim 5 wherein the bin cover has finger holes by which it is grasped to release the frictional catch of the generally normal tabs to the container bottom wall and permit the bin cover to swing upwardly on the frictional catch of its parallel-disposed tabs beneath the container bottom wall to accommodate insertion of a fresh roll of end-to-end connected bags into the bin.

7. A refuse receptacle as claimed in claim 6 wherein the bin cover is flush with the container bottom wall and the slot therethrough is located close to the edge containing the parallel disposed tabs.

8. A refuse receptacle as claimed in claim 1 wherein the container is of molded plastic and has an upstanding pocket adjacent its upper edge in which are stored ties used to secure the open top of the bags as they become filled with refuse and are separated from the roll.

9. A refuse receptacle comprising an open top container having an upstanding sidewall and a bottom wall spaced above the pedestal-constituting lower edge of said sidewall, said bottom wall containing a depending bin for storage of a roll of end-to-end connected bags which are used individually for lining the interior of the container, said bottom wall containing a generally rectangular-shaped opening through which a roll of bags can be inserted into the bin, the bin having a generally cylindrical-shaped seat on which the inserted roll of bags rests with its axis disposed generally parallel to the axis of said bin, and a bin cover for closing said opening, said bin cover containing a slot through which one end of the roll of bags is guided into the interior of the container, and means releaseably locking said bin cover in closed position cover said opening, the bottom wall of the container containing a recessed shelf about the periphery of the opening therethrough, on which the edge of the bin cover seats with its upper side generally flush with the surrounding upper surface of the container bottom wall, the bin cover being releasably hinged along one edge of the container bottom wall, and the slot on the bin cover through which the end bag of the roll of end-to-end connected bags is guided being closer to the releasably hinged side of the bin cover.

* * * * *

UNITED STATES PATENT AND TRADEMARK OFFICE
CERTIFICATE OF CORRECTION

PATENT NO. : 4,319,694
DATED : March 16, 1982
INVENTOR(S) : Joel M. Nehrbass and Gary J. Dorzok It is certified that error appears in the above—identified patent and that said Letters Patent is hereby corrected as shown below:

Column 2, line 46: "taken" should be -- wherein --.

Column 5, line 13: "T" should be underlined -- $\underline{T}$ --.

Column 6, line 53: "cover" should be -- over --.

Signed and Sealed this

First Day of June 1982

|SEAL|

*Attest:*

*Attesting Officer*

GERALD J. MOSSINGHOFF

*Commissioner of Patents and Trademarks*